(12) United States Patent
Tien et al.

(10) Patent No.: US 7,373,370 B2
(45) Date of Patent: May 13, 2008

(54) EXTENDABLE SQUARER AND OPERATION METHOD FOR PROCESSING DIGITAL SIGNALS

(75) Inventors: Shi-Ho Tien, Yanchao Township, Kaohsiung County (TW); Ching-Chun Meng, Longtan Township, Taoyuan County (TW); Tzu-Ying Chu, Jhonghe (TW); Yow-Ling Gau, Taipei Hsien (TW)

(73) Assignee: Chung Shan Institute of Science and Technology, Armaments Bureau, M.N.D., Taoyuan (TW)

( * ) Notice: Subject to any disclaimer, the term of this patent is extended or adjusted under 35 U.S.C. 154(b) by 716 days.

(21) Appl. No.: 10/899,734

(22) Filed: Jul. 26, 2004

(65) Prior Publication Data

US 2006/0020652 A1    Jan. 26, 2006

(51) Int. Cl.
*G06F 7/38*    (2006.01)
(52) U.S. Cl. .................................... 708/606
(58) Field of Classification Search ............... 708/606
See application file for complete search history.

(56) References Cited

U.S. PATENT DOCUMENTS

| 5,337,267 | A  | * | 8/1994  | Colavin | 708/606 |
| 6,260,056 | B1 | * | 7/2001  | Dalal   | 708/606 |
| 6,393,453 | B1 | * | 5/2002  | Purcell | 708/606 |
| 6,460,065 | B1 | * | 10/2002 | Purcell | 708/606 |

* cited by examiner

*Primary Examiner*—Tan V. Mai
(74) *Attorney, Agent, or Firm*—J.C. Patents (57) ABSTRACT

An extendable squarer for processing digital signals, suitable for processing a square operation for n-bit data is disclosed. The extendable squarer comprise a bit expanding circuit and a plurality of operating units. The bit expanding circuit comprises n−1 bit expanding output terminals for outputting a plurality of bit expanding data. The operation units receive a plurality of bit codes of the n-bit data corresponding thereto according to the binary weight. In addition, except for bit code of the most-significant bit, the other operation units receive the corresponding bit expanding data output by the bit expanding circuit respectively. The present invention generates the square operation value of the n-bit data based on the corresponding bit expanding data and bit codes.

7 Claims, 8 Drawing Sheets

| Bits | | | partial product-term |
|---|---|---|---|
| $y_{i+1}$ | $y_i$ | $y_{i-1}$ | |
| 0 | 0 | 0 | 0 |
| 0 | 0 | 1 | $+X \times 2^i$ |
| 0 | 1 | 0 | $+X \times 2^i$ |
| 0 | 1 | 1 | $+2X \times 2^i$ |
| 1 | 0 | 0 | $-2X \times 2^i$ |
| 1 | 0 | 1 | $-X \times 2^i$ |
| 1 | 1 | 0 | $-X \times 2^i$ |
| 1 | 1 | 1 | 0 |

FIG. 1

| | X = | + + + = | + + + = |
|---|---|---|---|
| $2^0$ | $A_0$ $A_0$ | $A_0 A_0$ | $A_0 A_0$ |
| $2^1$ | $A_1$ $A_1$ | $A_1 A_0$ $A_0 A_1$ | 0 |
| $2^2$ | $A_2$ $A_2$ | $A_2 A_0$ $A_1 A_1$ $A_0 A_2$ | $A_1 A_0$ $A_1 A_1$ |
| $2^3$ | $A_3$ $A_3$ | $A_3 A_0$ $A_2 A_1$ $A_1 A_2$ $A_0 A_3$ | $A_2 A_0$ 0 |
| $2^4$ | | $A_3 A_1$ $A_2 A_2$ $A_1 A_3$ | $A_3 A_0$ $A_2 A_1$ $A_2 A_2$ |
| $2^5$ | | $A_3 A_2$ $A_2 A_3$ | $A_3 A_1$ 0 |
| $2^6$ | | $A_3 A_3$ | $A_3 A_2$ $A_3 A_3$ |

FIG. 2

| $2^n$ | × = | + + + = | + + + = |
|---|---|---|---|
| $2^0$ | $B_0$<br>$B_0$ | $B_0 B_0$ | $B_0 B_0$ |
| $2^2$ | $B_1$<br>$B_1$ | $B_1 B_0$<br>$B_0 B_1$ | $2B_1 B_0$ |
| $2^4$ | $B_2$<br>$B_2$ | $B_2 B_0$<br>$B_1 B_1$<br>$B_0 B_2$ | $2B_2 B_0$<br>$B_1 B_1$ |
| $2^6$ | $B_3$<br>$B_3$ | $B_3 B_0$<br>$B_2 B_1$<br>$B_1 B_2$<br>$B_0 B_3$ | $2B_3 B_0$<br>$2B_2 B_1$ |
| $2^8$ | | $B_3 B_1$<br>$B_2 B_2$<br>$B_1 B_3$ | $2B_3 B_1$<br>$B_2 B_2$ |
| $2^{10}$ | | $B_3 B_2$<br>$B_2 B_3$ | $2B_3 B_2$ |
| $2^{12}$ | | $B_3 B_3$ | $B_3 B_3$ |

FIG. 3

| | X = | + + + = | + + + = |
|---|---|---|---|
| $2^0$ | $b_0$ $b_0$ | $b_0 b_0$ | $b_0 b_0$ |
| $2^1$ | $b_1$ $b_1$ | $b_1 b_0$ $b_0 b_1$ | $2b_1 b_0$ |
| $2^2$ | $b_2$ $b_2$ | $b_2 b_0$ $b_1 b_1$ $b_0 b_2$ | $2b_2 b_0$ $b_1 b_1$ |
| $2^3$ | $b_3$ $b_3$ | $b_3 b_0$ $b_2 b_1$ $b_1 b_2$ $b_0 b_3$ | $2b_3 b_0$ $2b_2 b_1$ |
| $2^4$ | | $b_3 b_1$ $b_2 b_2$ $b_1 b_3$ | $2b_3 b_1$ $b_2 b_2$ |
| $2^5$ | | $b_3 b_2$ $b_2 b_3$ | $2b_3 b_2$ |
| $2^6$ | | $b_3 b_3$ | $b_3 b_3$ |

FIG. 4

| | | | | |
|---|---|---|---|---|
| $2^0$ | $b_0$ | $b_0$ | $b_0 b_0$ | $2b_0 b_0$ |
| $2^1$ | $b_1$ | $b_1$ | $b_1 b_1$ $b_0 b_0$ | $2b_1 b_0$ |
| $2^2$ | $b_2$ | $b_2$ | $b_2 b_0$ $b_1 b_1$ $b_0 b_2$ | $2b_2 b_0$ $2b_1 b_1$ |
| $2^3$ | $b_3$ | $b_3$ | $b_3 b_0$ $b_2 b_1$ $b_1 b_2$ $b_0 b_3$ | $2b_3 b_0$ $2b_2 b_1$ |
| $2^4$ | $b_4$ | $b_4$ | $b_4 b_0$ $b_3 b_1$ $b_2 b_2$ $b_1 b_3$ $b_0 b_4$ | $2b_4 b_0$ $2b_3 b_1$ $b_2 b_2$ |
| $2^5$ | $b_5$ | $b_5$ | $b_5 b_0$ $b_4 b_1$ $b_3 b_2$ $b_2 b_3$ $b_1 b_4$ $b_0 b_5$ | $2b_5 b_0$ $2b_4 b_1$ $2b_3 b_2$ |
| $2^6$ | $b_6$ | $b_6$ | $b_6 b_0$ $b_5 b_1$ $b_4 b_2$ $b_3 b_3$ $b_2 b_4$ $b_1 b_5$ $b_0 b_6$ | $2b_6 b_0$ $2b_5 b_1$ $2b_4 b_2$ $b_3 b_3$ |
| $2^7$ | $b_7$ | $b_7$ | $b_7 b_0$ $b_6 b_1$ $b_5 b_2$ $b_4 b_3$ $b_3 b_4$ $b_2 b_5$ $b_1 b_6$ $b_0 b_7$ | $2b_7 b_0$ $2b_6 b_1$ $2b_5 b_2$ $2b_4 b_3$ |
| $2^8$ | | | $b_7 b_1$ $b_6 b_2$ $b_5 b_3$ $b_4 b_4$ $b_3 b_5$ $b_2 b_6$ $b_1 b_7$ | $2b_7 b_1$ $2b_6 b_2$ $2b_5 b_3$ $b_4 b_4$ |
| $2^9$ | | | $b_7 b_2$ $b_6 b_3$ $b_5 b_4$ $b_4 b_5$ $b_3 b_6$ $b_2 b_7$ | $2b_7 b_2$ $2b_6 b_3$ $2b_5 b_4$ |
| $2^{10}$ | | | $b_7 b_3$ $b_6 b_4$ $b_5 b_5$ $b_4 b_6$ $b_3 b_7$ | $2b_7 b_3$ $2b_6 b_4$ $b_5 b_5$ |
| $2^{11}$ | | | $b_7 b_4$ $b_6 b_5$ $b_5 b_6$ $b_4 b_7$ | $2b_7 b_4$ $2b_6 b_5$ |
| $2^{12}$ | | | $b_7 b_5$ $b_6 b_6$ $b_5 b_7$ | $2b_7 b_5$ $b_6 b_6$ |
| $2^{13}$ | | | $b_7 b_6$ $b_6 b_7$ | $2b_7 b_6$ |
| $2^{14}$ | | | $b_7 b_7$ | $b_7 b_7$ |
| $2^{15}$ | | | | |

EXTENDABLE SQUARER AND OPERATION METHOD FOR PROCESSING DIGITAL SIGNALS

BACKGROUND OF THE INVENTION

1. Field of the Invention

The present invention relates to a squarer, and more particularly to an extendable squarer.

2. Description of the Related Art

Square operations have been widely applied in VLSI circuits, communication systems and radar systems. Earlier, multipliers have been applied to execute the square operations. Due to the complicated operating systems or integrated circuits, hundreds of thousands of multipliers are required. This would cause the increase of costs.

Figure 1:
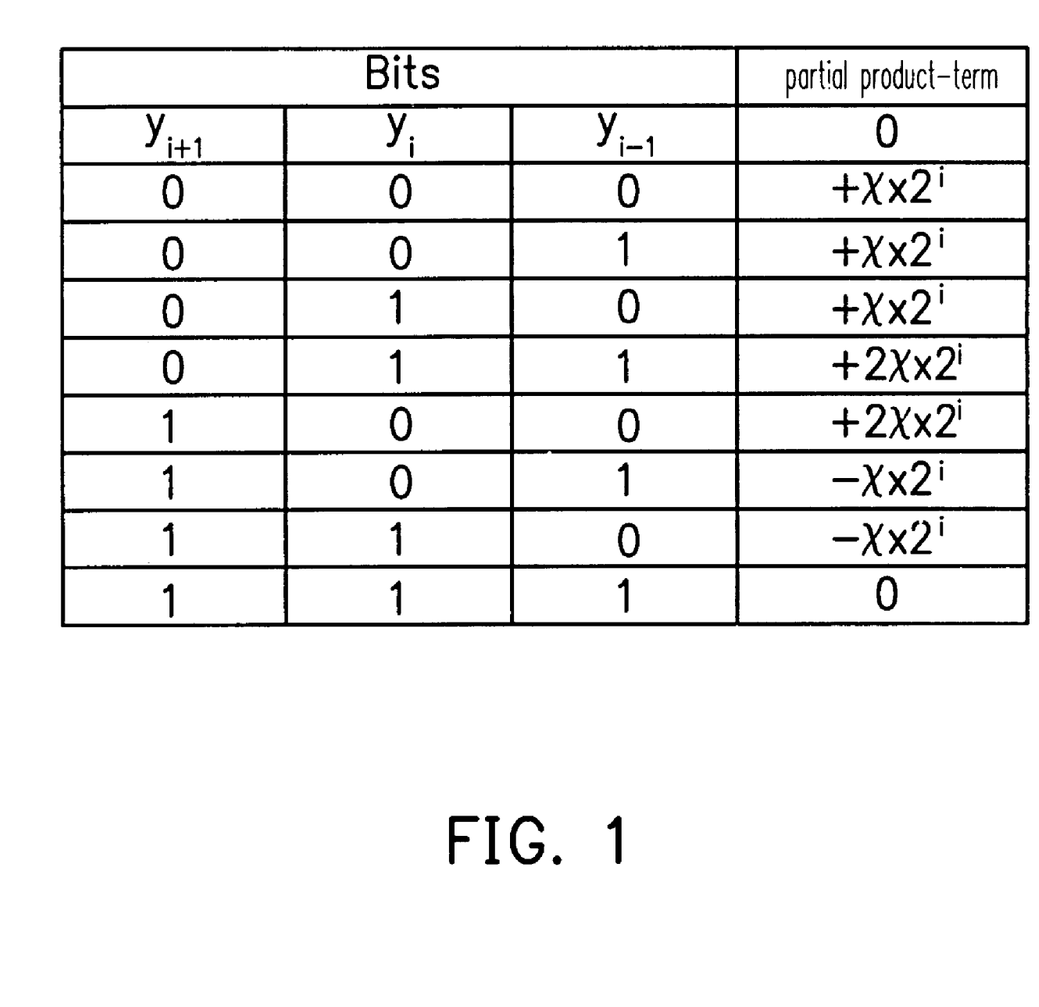
FIG. 1 is a table of Booth multiplication.

In order to resolve the problem, square operation technology and circuits have been developed. FIG. 1 is a table of Booth multiplication. Referring to FIG. 1, y represents a multiplicand, x represents a multiplier and i represents the number of bits and an integer. Booth method checks three bits and skips two bits for each operation. Therefore, one bit will be overlapped and m/2 column of the partial product terms are generated as shown in FIG. 1.

Figure 2:
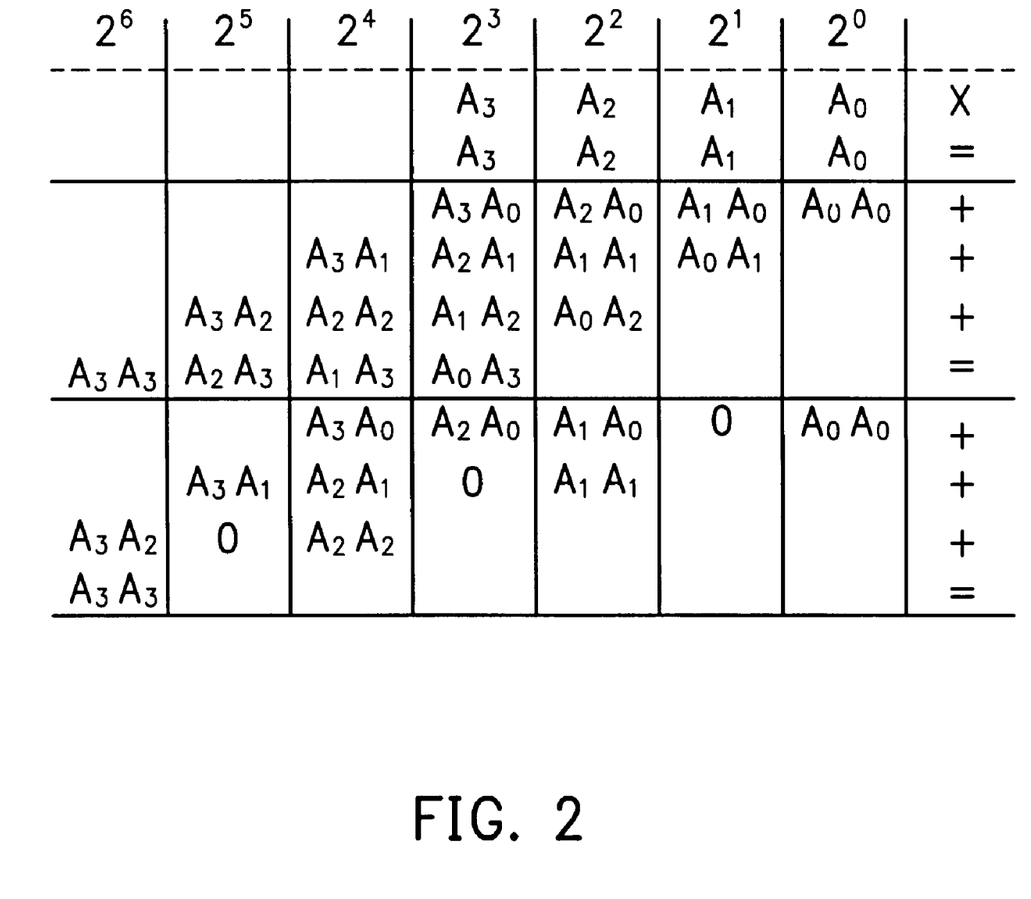
FIG. 2 is a partial multiplication matrix of a prior art squarer.

FIG. 2 is a partial multiplication matrix of a prior art squarer. Referring to FIG. 2, A represents bit codes, and subscripts represent the bits of the bit codes. In FIG. 2, it shows a partial multiplication matrix of a 4-bit data ($A_0$ $A_1$ $A_2$ $A_3$) square operation.

In addition, the Booth encoding method is also applied for square operations. For example, before the Booth encoding method performs square operations for 8-bit data, the 8-bit data are shown as below:

$$-b_7 2^7 + b_6 2^6 + \ldots + b_0 2^0 = B_3 2^6 + B_2 2^4 + B_1 2^2 + B_0 2^0$$

wherein b represents the bit codes of the 8-bit data, and the subscripts represent the bits of the bit codes. $B_1$, $B_2$, $B_3$ and $B_4$ represent the operators according to the Booth encoding method and are shown as below:

$$B_i = -2b_{2i+1} + b_{2i} + b_{2i-1}$$

Figure 3:
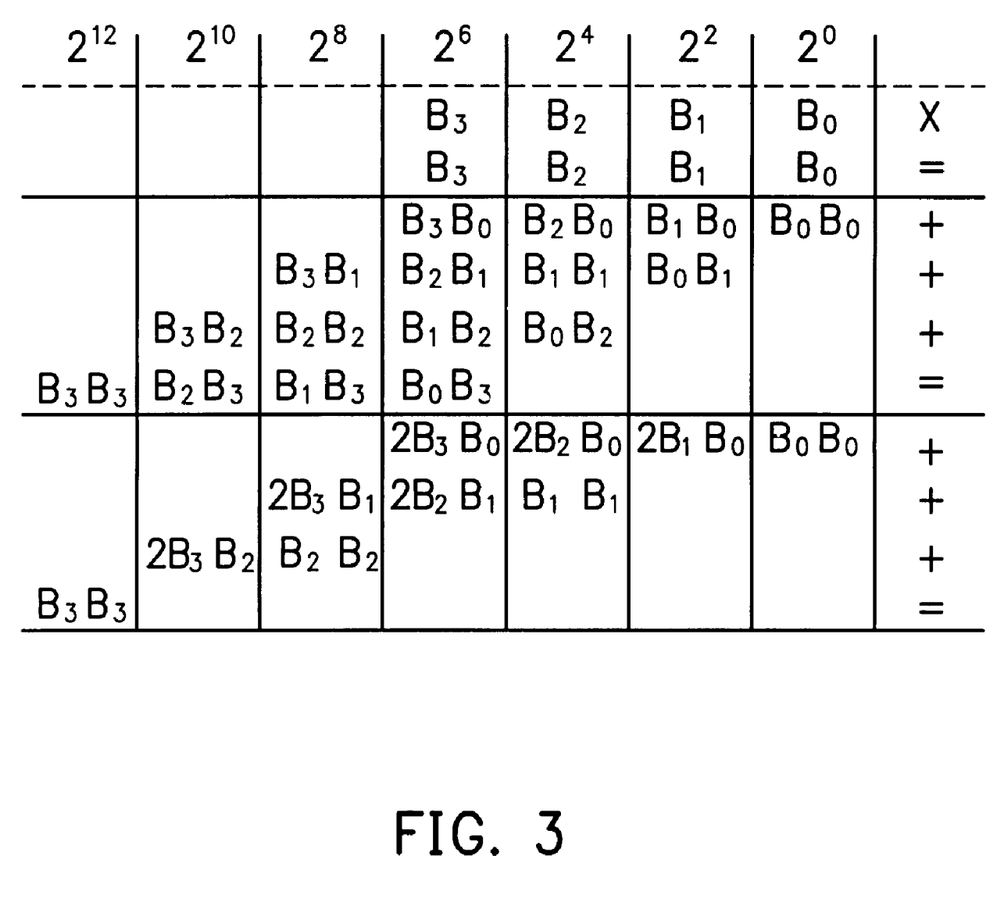
FIG. 3 is a partially folded multiplication matrix according to a 8-bit Booth method.

FIG. 3 is a partially folded multiplication matrix according to a 8-bit Booth method. Referring to FIG. 3, the square value of the 8-bit data can be shown as below:

$$(2B_3 2^6 + 2B_2 2^4 + 2B_1 2^2) \times B_0 2^0 + B_0 \times 2^0 + (2B_3 2^4 + 2B_2 2^2) \times B_1 2^4 +$$
$$B_1 \times B_1 2^4 + (2B_3 2^2) \times B_2 2^8 + B_2 \times B_2 2^8 + B_3 \times B_3 2^{12}$$

This formula can be simplified as below:

$$(P_0 2^3 + C_0) + (P_1 2^3 + C_1) 2^4 + (P_2 2^3 + C_2) 2^8 + C_3 2^{12}$$

wherein P and C are represented by the following formulas:

$$C_i = B_i \times B_i \quad i = 1, \ldots, 4$$

$$P_i = (-b_7 2^{5-2i} + b_6 2^{4-2i} + \ldots + b_{2+2} 2^0 + b_{2i+1} 2^0) \times B_i \quad i = 0, \ldots, 2$$

These prior art methods require a great size of the circuit. This requirement conflicts with the trend of integration of circuits.

SUMMARY OF THE INVENTION

Accordingly, the present invention is directed to an extendable squarer for effectively reducing the size of circuits.

The present invention is also directed to a method of square operation for the extendable squarer described above for data square operation.

The present invention discloses an extendable squarer for performing a square operation of a n-bit data. The n is a positive integer not equal to 0. The extendable squarer comprises a bit expanding circuit and a plurality of operating units. The bit expanding circuit has n−1 bit expanding output terminals for outputting corresponding bit expanding data, wherein an ith bit expanding data is $$-b_{n-1} 2^{n-2-i} + \sum_{k=1}^{n-3} \sum_{j=2}^{n-2} b_j 2^{k-i} + b_{i+1} 2^0$$

wherein $b_{n-1}$, $b_j$ and $b_{j+1}$ represent a n−1th, jth and i+1th bit codes of the n-bit data, and i, j and k are positive integers. The plurality of operating units receives the bit codes of the n-bit data according to a binary weight. Except for an operating unit receiving a bit code of a most-significant bit, input terminals of the operating units coupled to the bit expanding output terminals corresponding thereto for receiving the bit expanding data. Each of the operating units multiplies the bit expanding data with the bit code and with square of 2 and adding a square value of the bit code so as to generate an operator.

In the embodiment of the present invention, the extendable squarer further comprises an add operation unit for receiving output of the operating unit, and operating the output of the operating units as below:

$$\sum_{i=0}^{n-2} S_i 2^{2i} + C_{n-1} 2^{2(n-1)}$$

wherein $S_i$ represents an operator generated from the operating unit receiving the ith bit code; $C_{n-1}$ represents an operator generated from the operating unit receiving the bit code of the most-significant bit, which is equal to square of the bit code of the most-significant bit.

In some embodiments, the extendable squarer further comprises a decoder for generating the bit codes according to the binary weight.

The present invention also discloses a method of square operation for operating a square value of n-bit data. The n comprises n bit codes and is a positive integer. The method comprises generating n−1 bit expanding data, wherein an ith bit expanding data is $$-b_{n-1} 2^{n-2-i} + \sum_{k=1}^{n-3} \sum_{j=2}^{n-2} b_j 2^{k-i} + b_{i+1} 2^0$$

wherein $b_{n-1}$, $b_j$ and $b_{j+1}$ represent a n−1th, jth and i+1th bit codes of the n-bit data, and i, j and k are positive integers. Except for an operating unit receiving a bit code of a most-significant bit, each of the bit codes multiplies with one of the bit expanding data for generating a plurality of calculations. The calculations is multiplied with 2 and adding square values of the bit codes corresponding thereto for generating a plurality of operators. The square values of the n-bit data are generated by operating the operators according to the following formula:

$$\sum_{i=0}^{n-2} S_i 2^{2i} + C_{n-1} 2^{2(n-1)}$$

wherein $S_i$ represents an operator generated from the operating unit receiving the ith bit code; $C_{n-1}$ represents an operator generated from the operating unit receiving the bit code of the most-significant bit, which is equal to square of the bit code of the most-significant bit.

Accordingly, the present invention applies the formulas. The operating units generate the operators according to the bit codes and the bit expanding data corresponding thereto so as to generate the square values of the n-bit data. By these formulas, the extendable squarer of the present invention can be effectively reduced. The size of the whole system, therefore, also shrinks.

In order to make the aforementioned and other objects, features and advantages of the present invention understandable, a preferred embodiment accompanied with figures is described in detail below.

DESCRIPTION OF SOME EMBODIMENTS

Following are the descriptions of square operations for 4-bit and 8-bit data.

A formula describing 4-bit data is shown below:

$$B = -b_3 2^3 + b_2 2^2 + b_1 2^1 + b_0 2^0$$

wherein b represents the bit codes of the 4-bit data; the subscripts represent the bit of the bit codes. The square operation for the 4-bit data can be shown as the matrix in FIG. 4.

Figure 4:
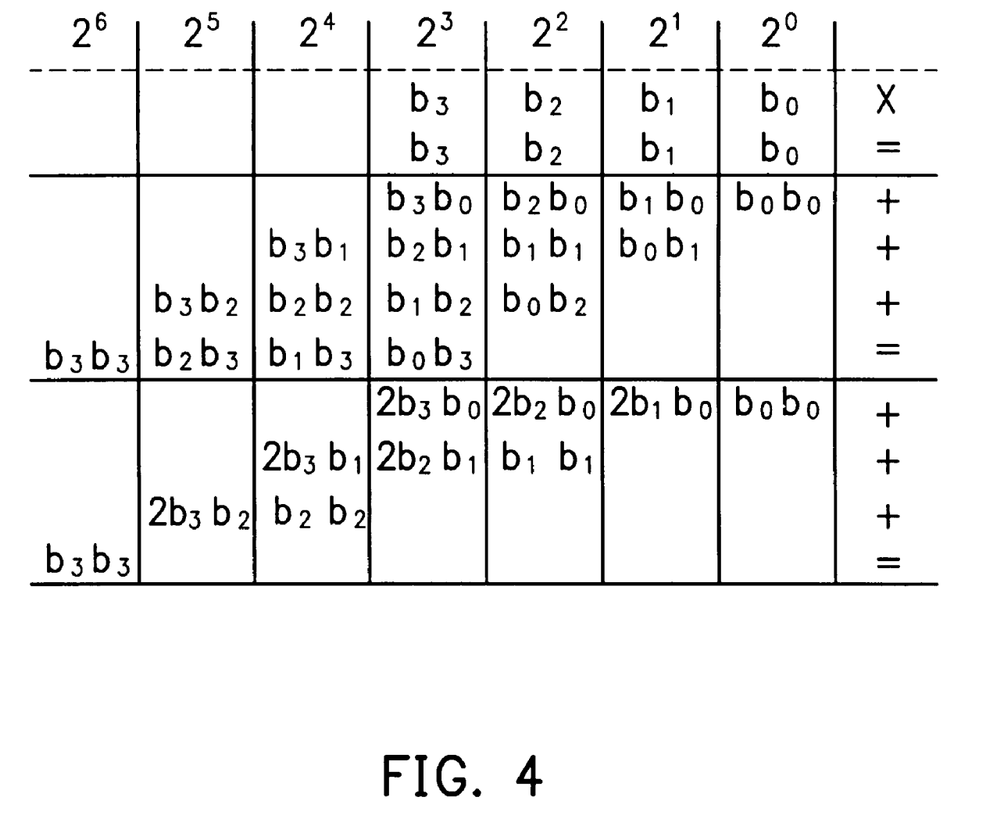
FIG. 4 is an operation matrix of a square operation for 4-bit data according to an embodiment of the present invention.

FIG. 4 is an operation matrix of a square operation for 4-bit data according to an embodiment of the present invention. Referring to FIG. 4, the matrix can be represented by the following formula (1):

$$B^2 = (-2b_3 2^3 + 2b_2 2^2 + 2b_1 2^1) \times b_0 2^0 + \qquad (1)$$
$$b_0 \times b_0 2^0 + (-2b_3 2^2 + 2b_2 2^1) \times b_1 2^2 + b_1 \times b_1 2^2 +$$
$$(-2b_3 2^1) \times b_2 2^4 + b_2 \times b_2 2^4 + b_3 \times b_3 2^6$$

Formula (1) can be simplified as below:

$$S_0 + S_1 2^2 + S_2 2^4 + C_0 2^6$$

wherein S and C can be represented as formula (2):

$$S_j = (P_j 2^2 + C_j)\ j=0,\ldots,2 \qquad (2)$$

$$C_i = b_i \times b_i\ i=0,\ldots,2$$

wherein $P_j$ is defined as below:

$$P_i = (-b_3 2^{2-i} + b_2 2^{1-i} + b_{i+1} 2^0) \times b_i\ i=0,\ldots,2$$

wherein a part of the formula is represented by $BE_i$, and $P_i$ is shown in formula (3):

$$P_i = BE_i \times b_i \qquad (3)$$

Following are the descriptions of the square operation for 8-bit data. A formula describing 8-bit data is shown below:

$$B = -b_7 2^7 + b_6 2^6 + b_5 2^5 + b_4 2^4 + b_3 2^3 + b_2 2^2 + b_1 2^1 + b_0 2^0$$

Figure 5:
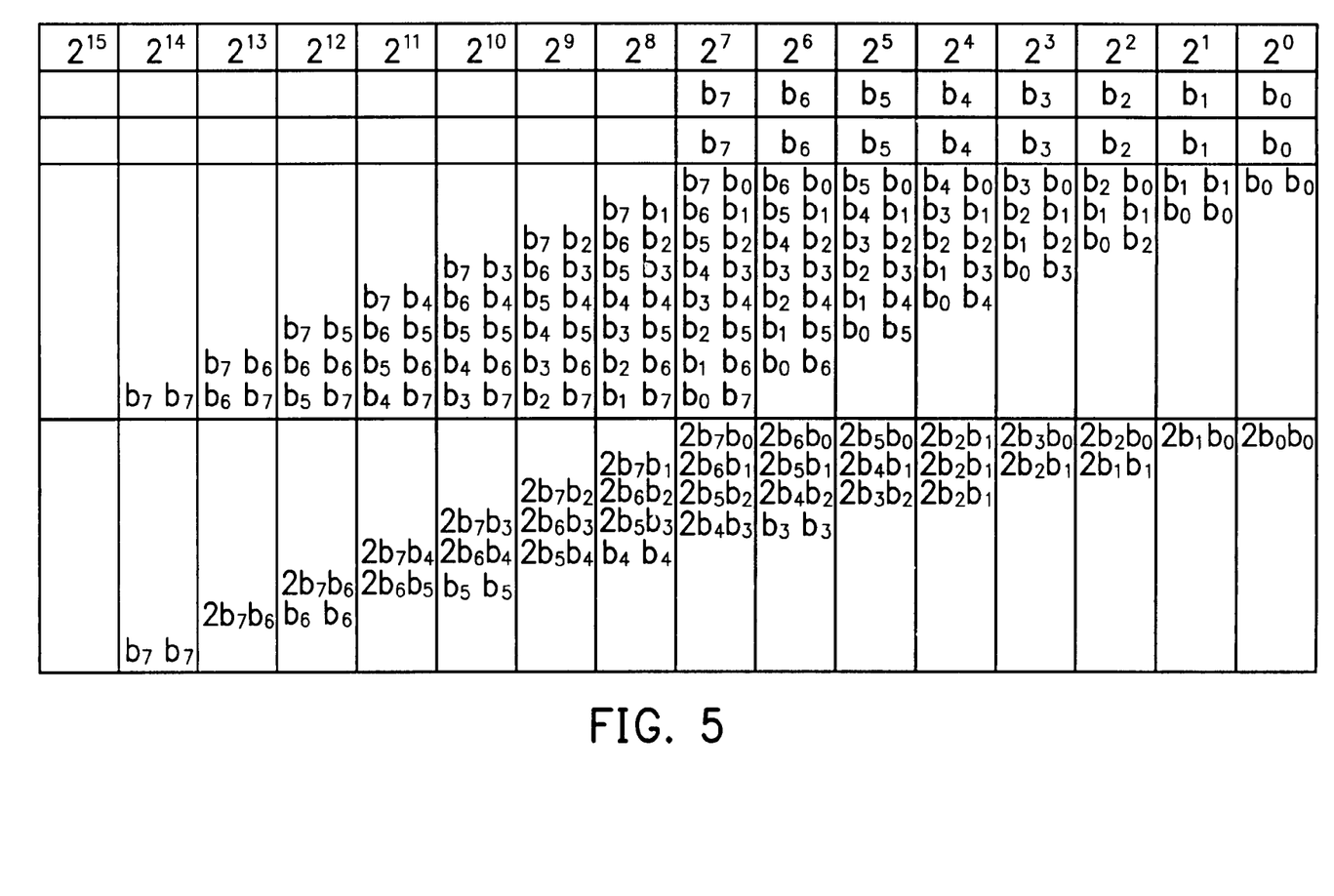
FIG. 5 is an operation matrix of a square operation for 5-bit data according to an embodiment of the present invention.

The square operation for the 8-bit data can be shown as the matrix in FIG. 5.

FIG. 5 is an operation matrix of a square operation for 5-bit data according to an embodiment of the present invention. Referring to FIG. 5, the matrix can be represented by the following formula:

$$B^2 = (-2b_7 2^7 + 2b_6 2^6 + 2b_5 2^5 + 2b_4 2^4 + 2b_3 2^3 + 2b_2 2^2 + 2b_1 2^1) \times b_0 2^0 +$$
$$b_0 \times b_0 2^0 + (-2b_7 2^6 + 2b_6 2^5 + 2b_5 2^4 + 2b_4 2^3 + 2b_3 2^2 + 2b_2 2^1) \times b_1 2^2 +$$
$$b_1 \times b_1 2^2 + (-2b_7 2^5 + 2b_5 2^4 + 2b_4 2^3 + 2b_3 2^2 + 2b_2 2^1) \times b_2 2^4 +$$
$$b_2 \times b_2 2^4 + (-2b_7 2^4 + 2b_6 2^3 + 2b_5 2^2 + 2b_4 2^1) \times b_3 2^6 +$$
$$b_3 \times b_3 2^6 + (-2b_7 2^3 + 2b_6 2^2 + 2b_5 2^1) \times b_4 2^8 +$$
$$b_4 \times b_4 2^8 + (-2b_7 2^2 + 2b_6 2^1) \times b_5 2^{10} + b_5 \times b_5 2^{10} +$$
$$(-2b_7 2^1) \times b_6 2^{12} + b_6 \times b_6 2^{12} + b_7 \times b_7 2^{14}$$

Figure 6:
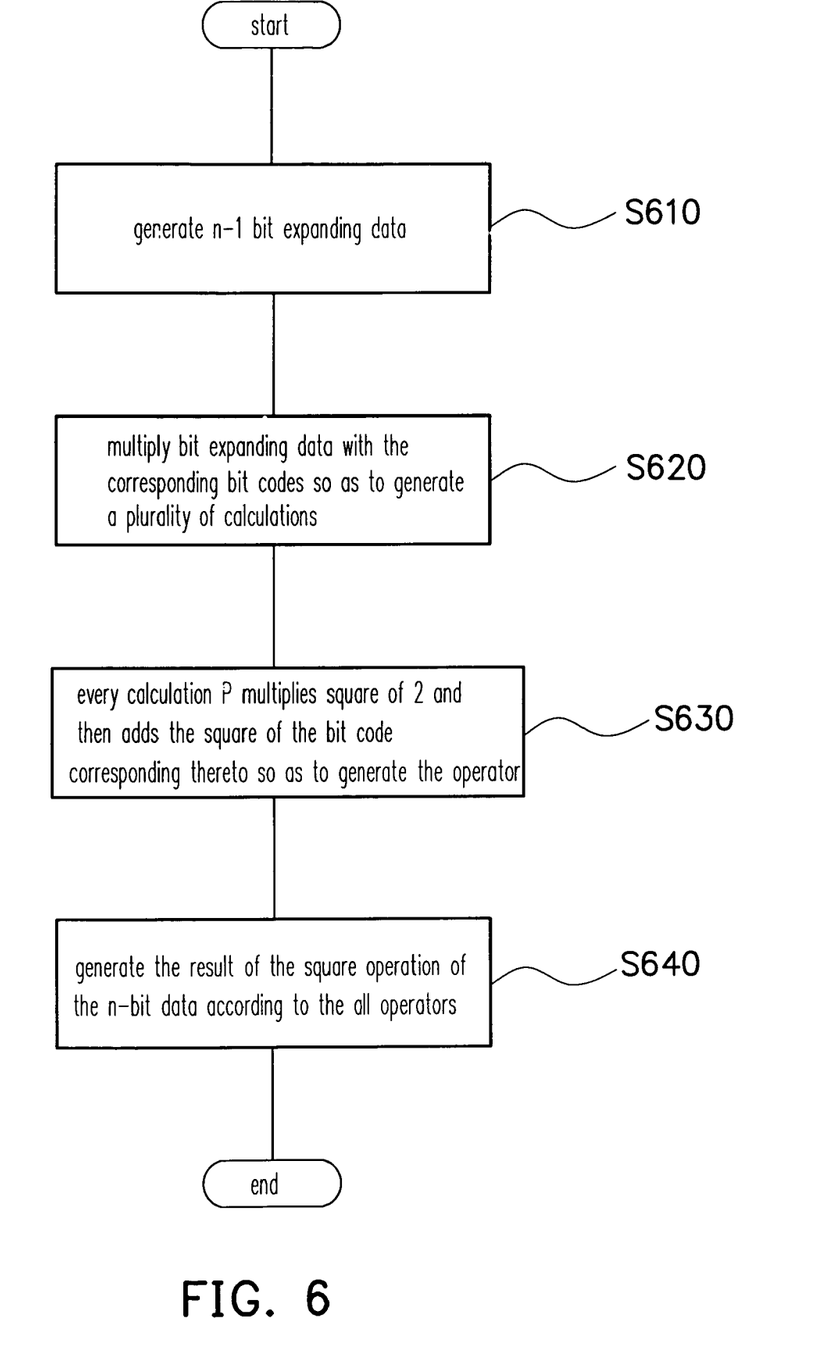
FIG. 6 is a flowchart showing a method of square operation according to an embodiment of the present invention.

This formula can be simplified as below:

$$S_0 + S_1 2^2 + S_2 2^4 + S_3 2^6 + S_4 2^8 + S_5 2^{10} + S_6 2^{12} + C_7 2^{14}$$

wherein S and C can be represented as below:

$$S_j = (P_j 2^2 + C_j)\ j=0,\ldots,6$$

$$C_i = b_i \times b_i\ i=0,\ldots,7$$

wherein $P_j$ is defined as below:

$$P_i = (-b_7 2^{6-i} + b_6 2^{5-i} + \ldots + b_2 2^{1-i} + b_{i+1} 2^0) \times b_i$$
$$i=0,\ldots,6$$

wherein a part of the formula is represented by $BE_i$, and $P_i$ is shown in formula (3):

FIG. 6 is a flowchart showing a method of square operation according to an embodiment of the present invention. According to the square operations for the 4-bit and the 8-bit data, the present invention discloses a square operation for n-bit data. Referring to FIG. 6, the present invention performs the square operation for the n-bit data. The n-bit data can be shown as below:

$$B = b_{n-1}2^{n-1} + b_{n-2}2^{n-2} + \ldots + b_0 2^0$$

Step S610 generates n−1 bit expanding data BE, the ith expanding data BE can be shown as below:

$$-b_{n-1}2^{n-2-i} + \sum_{k=1}^{n-3}\sum_{j=2}^{n-2} b_j 2^{k-i} + b_{i+1} 2^0 =$$

$$-b_{n-1}2^{n-2-i} + b_{n-2}2^{n-3-i} + \ldots + b_2 2^{1-i} + b_{i+1} 2^0 \quad i=0,\ldots,n-2$$

In step S620, every bit expanding data multiplies with the bit code corresponding thereto so as to generate calculations P as shown in formula (3). In step S630, every calculation P multiplies square of 2 and then adds the square of the bit code corresponding thereto so as to generate the operator S as shown below:

$$S_j = (P_j 2^2 + C_j) \, j=0,\ldots,n-2$$

$$C_i = b_i \times b_i \, i=0,\ldots,n-1$$

Step S640 generates the result of the square operation of the n-bit data according to the all operators S as below:

$$\sum_{i=0}^{n-2} S_i 2^{2i} + C_{n-1} 2^{2(n-1)}$$

The bit code of the most-significant bit of the n-bit data can represent the symbolic bit for determining whether the n-bit data are positive or not. If the n-bit data are negative, the bit expanding data BE should be reverse prior to operation.

Figure 7:
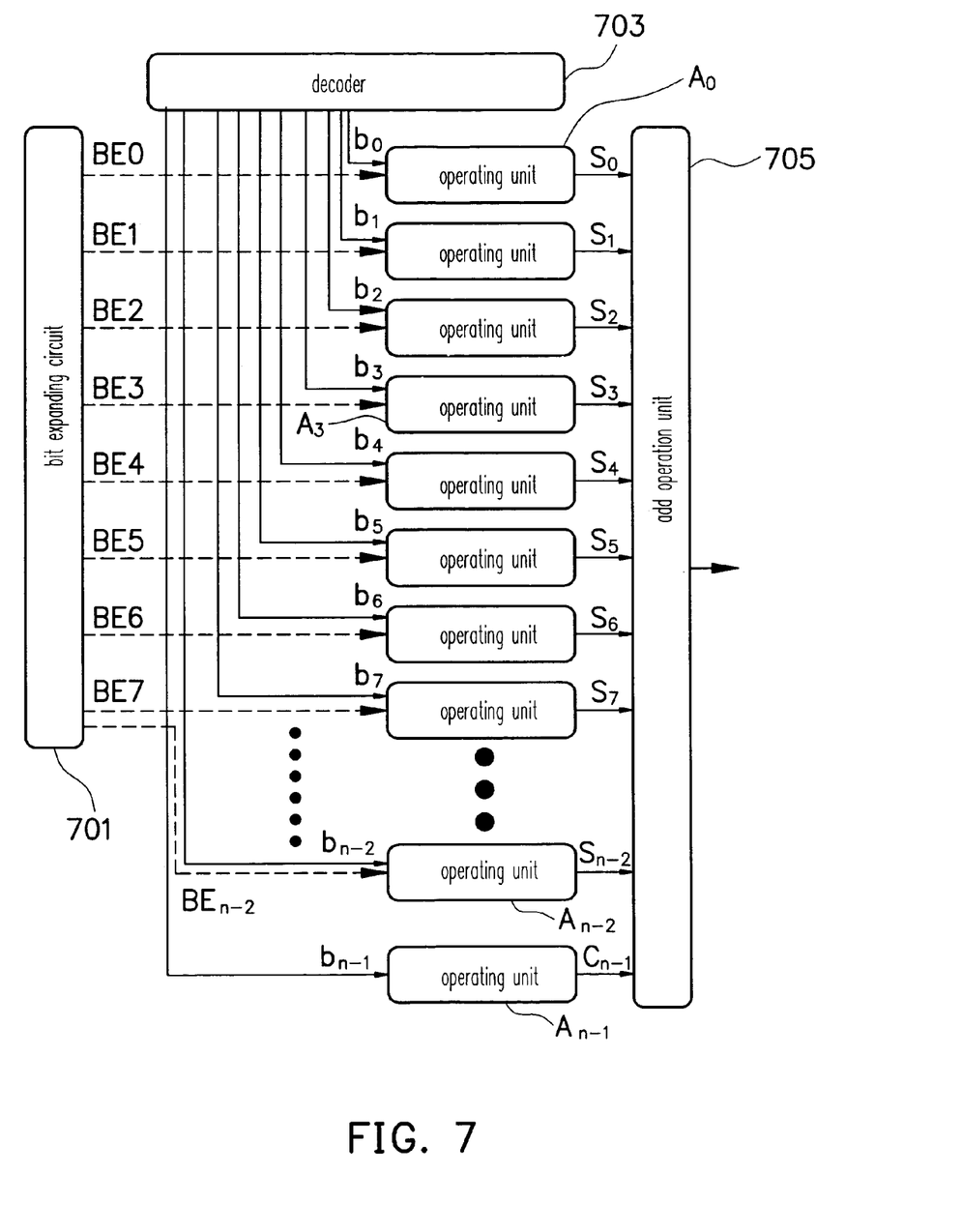
FIG. 7 is a block diagram showing an extendable squarer for n-bit data according to an embodiment of the present invention.

FIG. 7 is a block diagram showing an extendable squarer for n-bit data according to an embodiment of the present invention. Referring to FIG. 7, the design of the extendable squarer is in accordance with the method of the square operation. The bit expanding circuit 701 comprises n−1 bit expanding output terminals for outputting n−1 bit expanding data ($BE_0$~$BE_{n-2}$) to the operating units ($A_0$~$A_{n-2}$). Referring to FIG. 7, the extendable squarer further comprises n operating units ($A_0$~$A_{n-1}$) for receiving n bit codes of the n-bite data according to a binary weight.

Referring to FIG. 7, the extendable squarer further comprises a decoder 703 and an add operation unit. The decoder 703 is coupled to the input terminals of the operating units (A0~An−1) for generating the n bit codes to the corresponding operating units. Every operating unit generates the operator to the add operation unit 705 according to the input data, for square operation of the n-bit data. After the decoder 703 decodes the n-bit data into n bit codes (b0~bn−1), transmitting the bit codes (b0~bn−1) to the operating units (A0~An−1). Except for the operating unit An−1 receiving the bit code of the most-significant bit, the other operating units generates operators (S0~Sn−2) to the add operation unit 705 according to the bit expanding data $BE_i$ and bit codes $b_i$ as shown in steps S620 and S630 in FIG. 6. The operating unit $A_{n-1}$ squares the received bit codes $b_{n-1}$ so as to generate and transmit the operators $C_{n-1}$ to the add operation unit 705. The add operation unit 705 generates the square of the n-bit data according to the output from the operating units ($A_0$~$A_{n-2}$) as shown in step S640.

Figure 8:
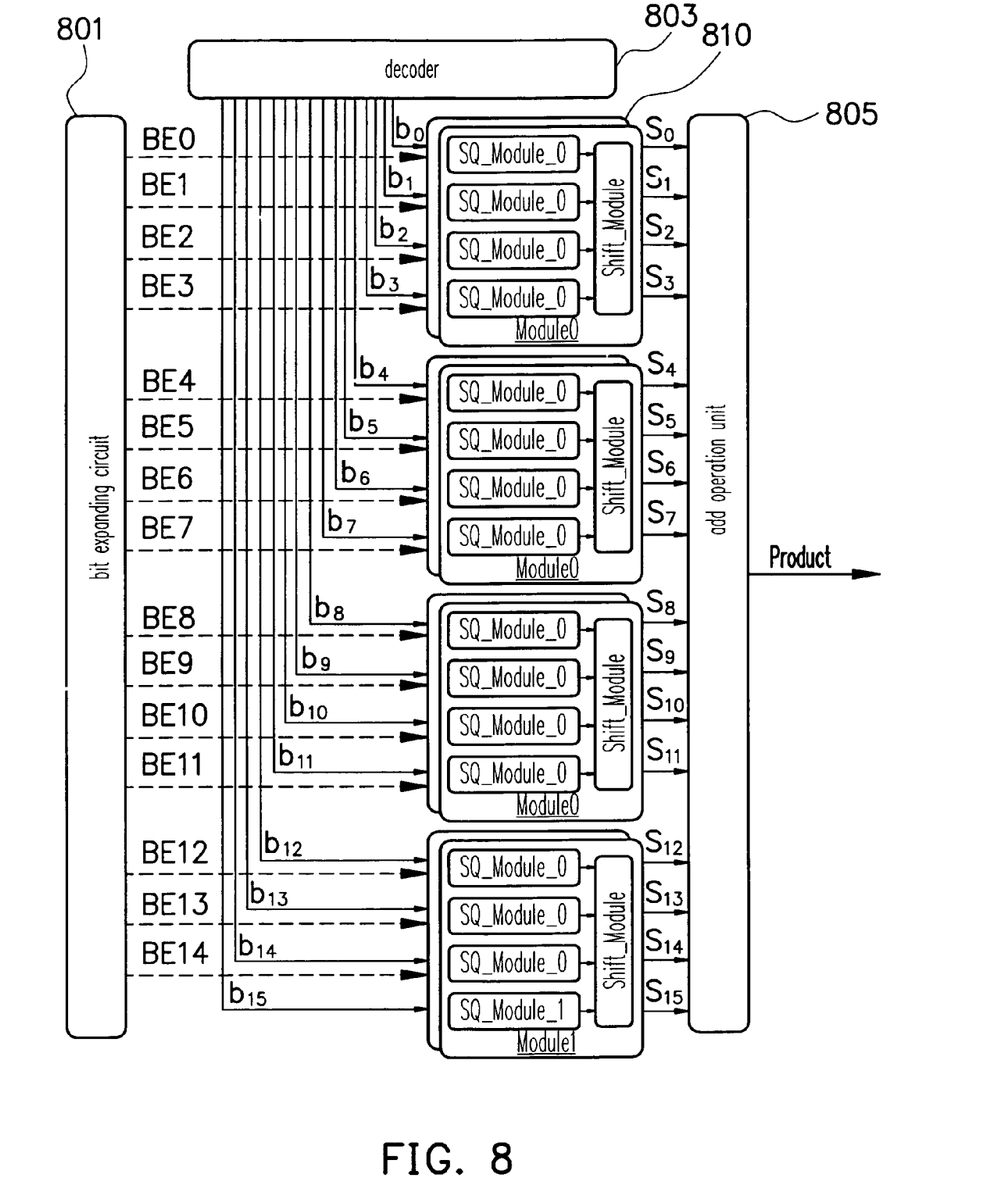
FIG. 8 is a block diagram showing an extendable squarer for 16-bit data according to an embodiment of the present invention.

FIG. 8 is a block diagram showing an extendable squarer for 16-bit data according to an embodiment of the present invention. Referring to FIG. 8, in order to shrink the size of the circuit for gigantic data operation, the extendable squarer of the present invention uses module technology. The extendable squarer in FIG. 8 comprises a bit expanding circuit 801, a decoder 803 and an add operation unit 805. What is different is that the operating units can be, for example, replaced by an operating module 810. The other items are similar to those described in FIGS. 6 and 7. Detailed descriptions are not repeated.

Although the 16-bit extendable squarer in FIG. 8 is implemented by module technology, the present invention is not limited thereto. One of ordinary skill in the art will understand that the module technology can be applied to the 4-bit and 8-bit extendable squarer. The number of the operating units in the operating module is not specifically restricted.

Accordingly, the extendable squarer designed in accordance with the square operation of the present invention can execute n-bit square operations. The present invention directly squares the n-bit data for designing the extendable squarer. The costs of the extendable squarer thus decline. In addition, the extendable squarer can adopt module technology so as to shrink the size of the circuit. Accordingly, the costs of the whole system are down.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. An extendable squarer for processing digital signals, suitable for performing a square operation of an n-bit data, n being a positive integer not equal to 0, the extendable squarer comprising:

a bit expanding circuit having n−1 bit expanding output terminals for outputting corresponding bit expanding data, wherein an ith bit expanding data is $$-b_{n-1}2^{n-2-i} + \sum_{k=1}^{n-3}\sum_{j=2}^{n-2} b_j 2^{k-i} + b_{i+1} 2^0$$

wherein $b_{n-1}$ $b_j$ and $b_{j+1}$ represent a n−1th, jth and i+1th bit codes of the n-bit data, and i, j and k are positive integers; and a plurality of operating units receiving the bit codes of the n-bit data according to a binary weight, except for an operating unit receiving a bit code of a most-significant bit, input terminals of the operating units coupled to the bit expanding output terminals corresponding thereto for receiving the bit expanding data, each of the operating units multiplying the bit expanding data with the bit code and square of 2 and adding a square value of the bit code so as to generate an operator.

2. The extendable squarer of claim 1, further comprising an add operation unit for receiving output of the operating unit, and operating the output of the operating units as below:

$$\sum_{i=0}^{n-2} S_i 2^{2i} + C_{n-1} 2^{2(n-1)}$$

wherein $S_i$ represents an operator generated from the operating unit receiving the ith bit code; $C_{n-1}$ represents an operator generated from the operating unit receiving the bit code of the most-significant bit, which is equal to square of the bit code of the most-significant bit.

3. The extendable squarer of claim 1, further comprising a decoder for generating the bit codes according to the binary weight.

4. The extendable squarer of claim 1, wherein the bit code of the most-significant bit of the n-bit data represents a symbolic bit for determining whether the n-bit data are positive.

5. A method of square operation for processing digital signals, suitable for operating a square value of an n-bit data, n comprising n bit codes and being a positive integer, the method comprising:

generating n−1 bit expanding data, wherein wherein an ith bit expanding data is $$-b_{n-1} 2^{n-2-i} + \sum_{k=1}^{n-3} \sum_{j=2}^{n-2} b_j 2^{k-i} + b_{i+1} 2^0$$

wherein $b_{n-1}$, $b_j$ and $b_{j+1}$ represent a n−1th, jth and i+1th bit codes of the n-bit data, and i, j and k are positive integers;

except for an operating unit receiving a bit code of a most-significant bit, each of the bit codes multiplying with one of the bit expanding data for generating a plurality of calculations;

multiplying the calculations with 2 and adding square values of the bit codes corresponding thereto for generating a plurality of operators; and generating the square values of the n-bit data by operating the operators according to the following formula:

$$\sum_{i=0}^{n-2} S_i 2^{2i} + C_{n-1} 2^{2(n-1)}$$

wherein $S_i$ represents an operator generated from the operating unit receiving the ith bit code; $C_{n-1}$ represents an operator generated from the operating unit receiving the bit code of the most-significant bit, which is equal to square of the bit code of the most-significant bit.

6. The method of square operation of claim 5, wherein the bit code of the most-significant bit of the n-bit data represents a symbolic bit for determining whether the n-bit data are positive.

7. The method of square operation of claim 5, wherein, when the n-bit data are negative, the bit expanding data are reverse prior to operation.

* * * * *